United States Patent [19]

Mueller

[11] E Re. 28,882

[45] Reissued June 29, 1976

[54] DISPENSING CARTON

[75] Inventor: David Charles Mueller, Neenah, Wis.

[73] Assignee: American Can Company, Greenwich, Conn.

[22] Filed: Feb. 11, 1975

[21] Appl. No.: 548,915

Related U.S. Patent Documents

Reissue of:

[64] Patent No.: 3,773,247
Issued: Nov. 20, 1973
Appl. No.: 285,915
Filed: Sept. 1, 1972

[52] U.S. Cl. ..... 229/44 CB; 206/273
[51] Int. Cl.[2] ..... B65D 5/66
[58] Field of Search ..... 229/44 CB, 19, 20; 206/264, 271, 273

[56] References Cited

UNITED STATES PATENTS

| | | | |
|---|---|---|---|
| 1,185,560 | 5/1916 | Walcutt | 229/44 CB X |
| 2,776,081 | 1/1957 | Ringler | 229/19 X |
| 2,950,060 | 8/1960 | Von Rudeen | 229/44 CB |
| 3,048,320 | 8/1962 | Hovland et al. | 229/20 |
| 3,102,675 | 9/1963 | Schrom | 206/273 X |
| 3,311,283 | 3/1967 | Shimida et al. | 229/44 CB X |
| 3,773,245 | 11/1973 | Meyers | 206/264 |
| 3,773,247 | 11/1973 | Mueller | 229/44 CB |

FOREIGN PATENTS OR APPLICATIONS

| | | |
|---|---|---|
| 970,740 | 9/1964 | United Kingdom |

*Primary Examiner*—Davis T. Moorhead
*Attorney, Agent, or Firm*—Robert P. Auber; Ira S. Dorman; George P. Ziehmer

[57] ABSTRACT

A two-piece paperboard carton for retaining and dispensing cigarettes and the like, comprising a shell and a slide receptacle inserted into the shell. A simple motion of pulling down on the shell is sufficient to open the slide receptacle while an opposite action is effective to close the receptacle.

13 Claims, 6 Drawing Figures

DISPENSING CARTON

Matter enclosed in heavy brackets [ ] appears in the original patent but forms no part of this reissue specification; matter printed in italics indicates the additions made by reissue.

BACKGROUND OF THE INVENTION

This invention relates to a dispensing carton construction for the retention and dispensing of cigarettes, small cigars or the like, and more particularly to a two-piece, paperboard carton construction that is especially compact and is able to be opened and closed by a simple, sliding, reciprocable motion.

Prior art cartons having sliding sleeves for providing dispensing openings have been, of necessity, either too complex, leading to rapid deterioration of the carton, or too difficult to open, often times the closing procedure having no relation to the opening procedure.

The instant invention solves the problems of the prior art cartons by presenting a construction that is compact enough to be able to withstand rough handling by the user over a period of time, and which is opened and closed by a simple, reciprocable action.

SUMMARY OF THE INVENTION

The present invention provides a two-piece, suitably cut and scored paperboard blank capable of being erected into a dispensing carton, comprising a slide receptacle portion and a shell portion, said slide receptacle portion comprising:

- a front wall panel;
- a pair of opposed side wall panels hingedly connected to the sides of the front wall panel;
- a bottom wall panel hingedly connected to the bottom of the front wall panel;
- a rear wall panel hingedly connected to the bottom wall panel on the opposite edge from the front wall panel;
- a pair of opposed fold-in panels hingedly connected to the sides of the rear wall panel;
- a pair of opposed bottom wall glue flaps hingedly connected to the bottom of the fold-in panels;
- a rear wall connecting panel depending from the top of the rear wall panel across an alternate cut and crease line;
- a pair of opposed fold-in flaps hingedly connected to the sides of the connecting panel; and
- a top wall panel hingedly connected to the top of the connecting panel; and said shell portion comprising:

- a rear wall panel;
- a pair of opposed side wall panels hingedly connected to the sides of the rear wall panel;
- a front wall panel hingedly connected to one of the side wall panels and extending laterally therefrom;
- a side wall panel glue flap hingedly connected to the front wall panel and extending laterally therefrom,
- a foldover panel hingedly connected to the top edge of the rear wall panel;
- at least one folding panel hingedly connected to and extending from the edge of the foldover panel parallel to the rear wall panel top edge;
- a hinge panel extending longitudinally from and hingedly connected to the adjacent folding panel; and

- a glue panel extending longitudinally from and hingedly connected to the hinge panel.

*The invention also provides a dispensing carton comprising a slide receptacle having a body portion with an open end and a cover portion hingedly connected to the body portion for pivotal movement between a closed position covering the open end and an open position displaced therefrom, and a shell having a slide portion and actuating means joined thereto. The slide portion is slidably mounted on the body portion of the receptacle for sliding movement toward and away from the open end thereof. The actuating means includes a first panel portion hingedly connected to the cover portion at a location spaced from the hinge connection of the body and cover portions, a second panel portion hingedly connected to the slide portion, and a folding panel portion hingedly connected along opposite margins between the first and second panel portions. All of the hinge connections are substantially parallel to one another, and the actuating means extends between the receptacle and the slide portion, with the first and second panels thereof extending away from the open end, from their hinge connections with the cover portion and slide portion, respectively.*

*Preferably, the folding panel portion consists of at least two panels hingedly connected to one another, with the hinge connections therebetween being substantially parallel to the other hinge connections present in the carton. The length of the first panel portion is desirably substantially equal to the combined lengths of the second panel portion and the folding panel portion, with the cover portion and body portion having rear walls which lie in a common plane, and with the hinge connections of the first and second panel portions to the cover portion and the slide portions to the cover portion and the slide portion being adjacent the outer margins of, respectively, the cover portion rear wall and the slide portion. In such a construction, the slide portion will be in part disposed over the cover portion in the closed position, and will be displaced therefrom by sliding of the slide portion away from the open end. Usually, the receptacle of the carton will be of generally rectangular cross section, and the slide portion will comprise a band extending in close conformity thereabout.*

DESCRIPTION OF THE PREFERRED EMBODIMENT

Figure 2:
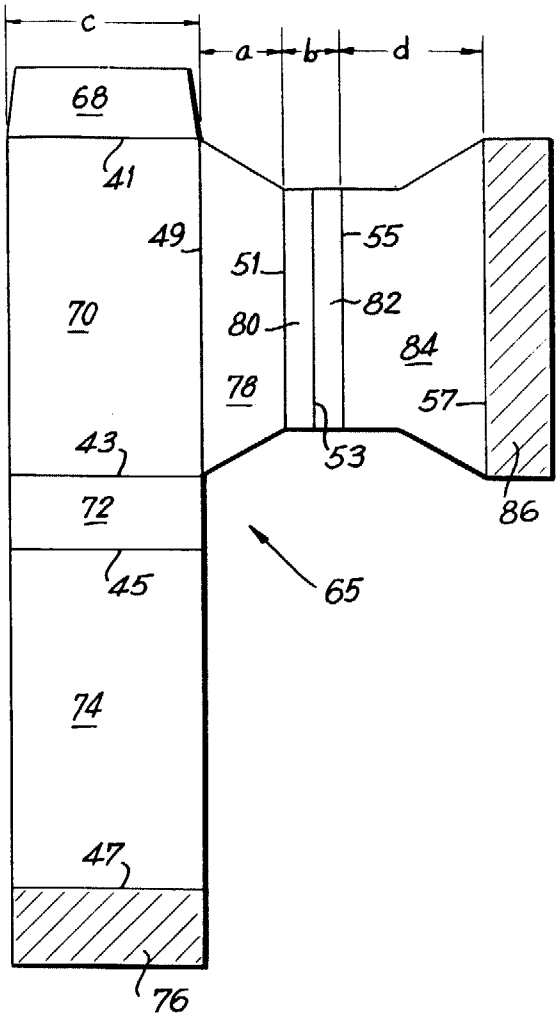
FIG. 2 is a plan view of the blank to be used in forming the shell, also shown with its inside surface exposed upwardly.
Figure 3:
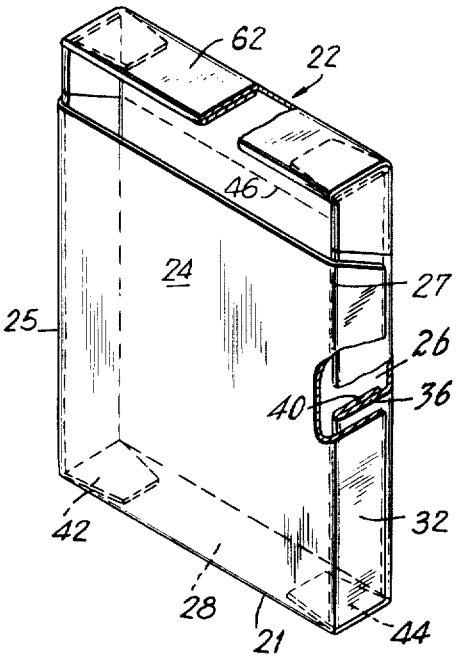
FIG. 3 is a perspective view of the slide receptacle blank shown in FIG. 1 after it has been erected.

As shown in the drawings illustrative of the preembodiment of the paperboard carton of the subject invention:

A slide receptacle blank 20 (FIG. 1) is provided to form a rectangular slide receptacle 22 (FIG. 3) capable of receiving the product to be dispensed. The receptacle blank 20 is suitably cut and scored to provide a receptacle front wall panel 24, and a receptacle rear wall panel 26 hingedly connected by a receptacle bottom wall panel 28 therebetween along parallel score lines 21 and 23 respectively.

A pair of opposed receptacle side wall panels 30 and 32 are hingedly connected to the sides of the front wall panel 24 along parallel score lines 25 and 27 respectively. Similarly, hingedly connected to the sides of the rear panel 26 along parallel score lines 29 and 31 respectively are a pair of opposed receptacle side wall fold-in panels 34 and 36. Sidewall glue panels 38 and 40 extend laterally from and are hingedly connected respectively to fold-in panels 34 and 36 along parallel score lines 33 and 35 respectively. Hingedly connected along score line 23 to each of the side wall fold-in panels 34 and 36 and adjacent the bottom wall panel 28 are receptacle bottom wall glue flaps 42 and 44 respectively.

Hingedly connected across the top of the rear panel 26 by an alternate cut and crease line 46 is a rear wall connecting panel 48 having a pair of opposed, side wall fold-in flaps 50 and 52 hingedly connected along parallel score lines 29 and 31 respectively. A pair of opposed side wall glue flaps 54 and 56 are hingedly connected respectively to the top of fold-in flaps 50 and 52 along score line 37. A pair of opposed side wall glue flaps 58 and 60 are hingedly connected along parallel score lines 33 and 35 respectively to the exterior side of each of the fold-in flaps 50 and 52 adjacent the side wall glue panels 38 and 40 respectively.

A top wall panel 62 is hingedly connected along score line 37 to the top of the connecting panel 48; similarly, a top wall glue panel 64 is hingedly connected longitudinally to the top wall panel 62 along score line 39.

As the drawings illustrate, some of the panels of the slide receptacle blank 20 are shown as not being rectangular. This is a matter of design, and the shapes of these panels may be varied. It should also be noted that glue panels 38 and 40 and glue flaps 58 and 60 are utilized for achieving an extra thick side wall and may not be necessary. Furthermore, the glue panel 64 may not be required for all purposes and could be eliminated. These modifications could easily be made, with corresponding small changes in areas where glue is to be applied and ultimate assembly procedures.

Figure 4:
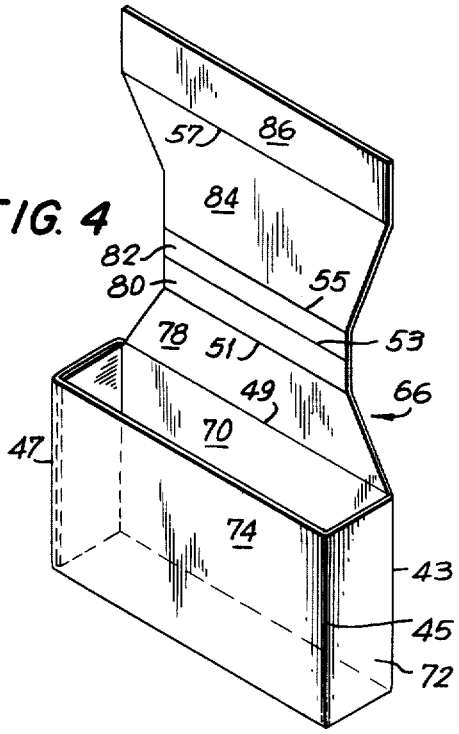
FIG. 4 is a perspective view of the shell partially erected.

A shell blank 65 (FIG. 2) is provided to form a shell 66 (FIG. 4) to slidingly receive the slide receptacle 22. As will be explained below, the shell 66 is to be attached to the slide receptacle 22. The shell blank 65 is suitably cut and scored to provide a pair of opposed shell side wall panels 68 and 72, a shell rear wall panel 70, a shell front wall panel 74 and a shell side wall panel glue flap 76, all hingedly connected, as shown, by parallel score lines 41, 43, 45 and 47. It is apparent that the height of the above-named panels, indicated as c, may be varied, but a height about one-half that of the slide receptacle 22 has been found to be most satisfactory. Such a relationship enables the carton to be easily opened and closed by a sample, two-handed action.

A trapezoidal foldover panel 78 having a height a is hingedly connected to the top edge of the shell rear wall panel 70 along score line 49. A pair of folding panels 80 and 82 are hingedly connected to foldover panel 78 along score line 51 and to each other along score line 53. The folding panel 80 extends from the edge of the foldover panel 78 which is parallel to the rear wall panel 70 top edge defined at score line 49; i.e., folding panel 80 extends from score line 51. It should be noted that one folding panel is necessary and that more than one may be employed. In order to assure that the folding action of panels 80 and 82 is hidden and occurs completely within the shell, the height a of panel 78 should exceed the height b of panels 80 and 82 combined. Such a relatonship insures the hiding of panels 80 and 82 when the carton is opened. Similarly, the height of a plus b should be less than height c to insure that panels 80 and 82 are concealed from view when the carton is closed. The height of a individual folding panel, in this case 1/2b, should be small enough to permit the folding panels 80 and 82 to undergo the necessary rotation and translation without unduly disturbing the configuration of the erected carton during opening and closing of the carton. These relationships are all merely preferred, and may be varied if the particular results achieved by them are not necessary or critical.

A hinge panel 84 extends longitudinally from and is hingedly connected to the folding panel 82 along score line 55 and hingedly connects to a shell glue panel 86 extending longitudinally therefrom along score line 57. The shapes of the foldover panel 78, shown as trapezoidal, and of the hinge panel 84 may both be varied. For a compact and proper appearing package, and ease of opening, the height d of the hinge panel 84 should equal the combination of heights a plus b, and the height a should equal the height e of the slide receptacle rear wall connecting panel 48. Also, height b of the folding panels 80 and 82 should approximate the smaller height f of the fold-in flaps 50 and 52 for ease of opening and closing the carton. The necking in of panels 78 and 84 also is a desirable feature, but not necessary for the successful operation of the carton.

Figure 1:
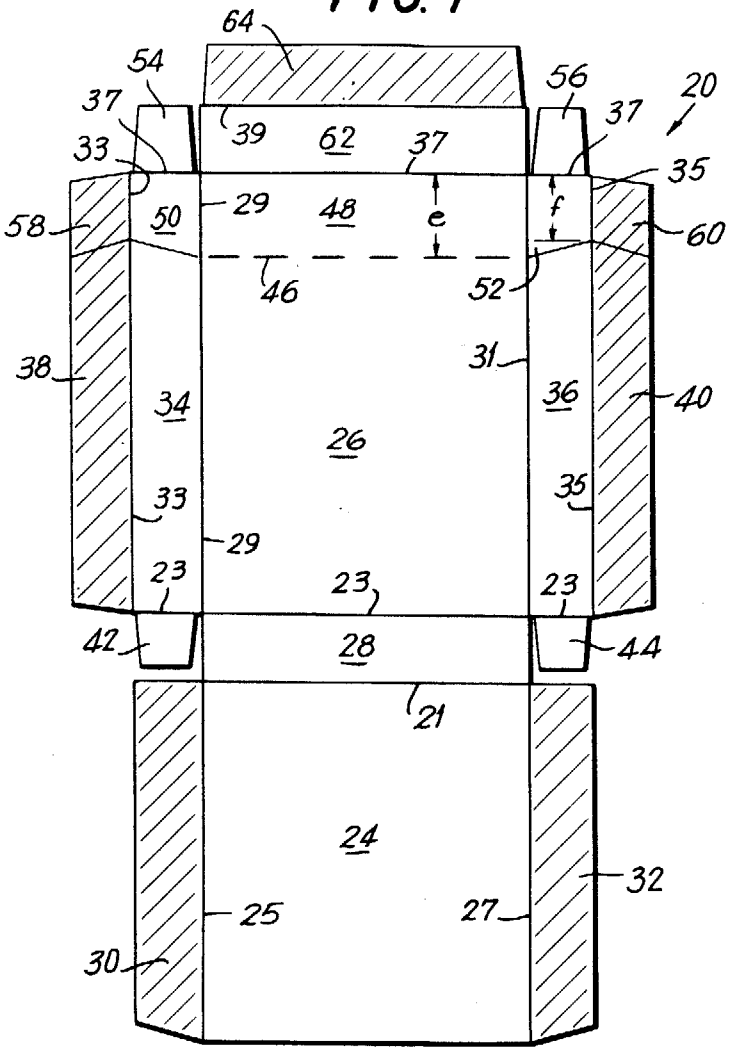
FIG. 1 is a plan view of the blank to be formed into the slide receptacle. The blank is illustrated as having its inside surface exposed upwardly.

In forming the two blanks 20 and 65 into a dispensing carton, an adhesive is first applied to the inner surface of the slide receptacle blank 20 on side wall panels 30 and 32, the side wall glue panels 38 and 40, the top wall glue panel 64, and the side wall glue flap 58 and 60, as shown by the stippling on these areas in FIG. 1, after which glue panel 38 and glue flap 58 are folded inwardly (see FIG. 3) about score line 33 to adhere respectively to fold-in panel 34 and fold-in flap 50. A similar action is also effected about score line 35 for the opposed side wall panels and flaps.

The folded double panels effected above are now folded again to lie in a plane perpendicular to the remainder of the receptacle blank 20. Specifically, fold-in panel 34 and fold-in flap 50 are folded inwardly about score line 29 to lie in a plane perpendicular to rear wall panel 26. The folding of panel 34 results in glue flap 42 similarly lying in the perpendicular plane, as does the folding of flap 50 result in flap 54 assuming a perpendicular position. A similar folding action is also effected about score line 31 whereby the opposed side wall panels and flaps assume a perpendicular position.

In the next step of the carton formation process, the bottom wall glue flaps 42 and 44 are folded inwardly about score line 23 to lie in a plane perpendicular to either of the planes formed by the opposed side wall panels and flaps. Following this, the bottom wall panel 28 is folded inwardly about score line 23 to lie superposed on the glue flaps 42 and 44 and perpendicular to the rear wall panel 26.

The front wall panel 24 is then folded inwardly about score line 21 to lie parallel to the rear wall panel 26. Finally, the side wall panels 30 and 32 are folded inwardly about score lines 25 and 27 respectively to be perpendicular to the front wall panel 24 and adhere to the outside surfaces of the opposed fold-in panels 34 and 36 respectively.

At this point, it is suggested that the product to be dispensed by the carton be loaded into the partially erected receptacle blank 20. Following such loading, the side wall glue flaps 54 and 56 are folded inwardly about score line 37 to lie perpendicular to each of the two side walls.

The top wall panel 62 is folded inwardly about score line 37 to lie perpendicular to the connecting panel 48 and superpose glue flaps 54 and 56. The final step in erecting the rectangular slide receptacle 22 shown in FIG. 3 consists of folding inwardly the top wall glue panel 64 about score line 39 to adhere to the glue flaps 54 and 56 and the top panel 62.

The shell blank 65 is attached to the slide receptacle 22 as explained below. Adhesive is applied to the inner surface of the shell side panel glue flap 76 and the shell glue panel 86. The inner surface of the glue panel 86 is then adhered to the exposed, outer surface of the slide receptacle top wall panel 62, score line 57 of the shell blank [ 64 ] *65*, being superposed above score line 37 of the slide receptacle blank 20. Rear wall panel 70 is then folded inwardly about score line 49 to superpose on the foldover panel 78. The foldover panel 78, rear wall panel 70, and folding panels 80 and 82, then, as a double panel unit, are folded outwardly about score line 55 to superpose on the hinge panel 84, thereby creating a triple thickness panel. The hinge panel 84, together with the two remaining panels forming the triple panel, are now folded inwardly about score line 57 to superpose the receptacle rear wall panel 26.

The shell side wall panel 72 is then folded inwardly about score line 43 to superpose on the outside surfaces of the receptacle fold-in flap 52 and side wall panel 32. The front wall panel 74 is then folded inwardly about score line 45 to superpose on the outside surface of the slide receptacle front wall panel 24. The side wall panel 68 is then folded inwardly about score line 41 to superpose on the outside surface of side wall panel 30 and fold-in flap 50. Finally, the side panel glue flap 76 is folded inwardly about score line 47 to adhere to the outside surface of the side wall panel 68. The carton is now effectively closed.

The above described method of assembling the carton is merely illustrative of several possible different sequences that may be employed, and forms no part of the invention.

Opening the closed carton (FIG. 6) is preferably effected by grasping with the thumb of one hand the lower portion of the side wall panel 32 of the slide receptacle 22 and with some of the remaining fingers of that hand grasping the lower portion of the other side wall panel 30. Simultaneously, the other thumb grasps the shell side wall panel 72 while some of the remaining fingers grasp the shell side panel glue flap 76 and pull down on the panel 72 and glue flap 76 to expose the product contained within the slide receptacle 22. An opposite action is effective to close the carton.

Figure 5:
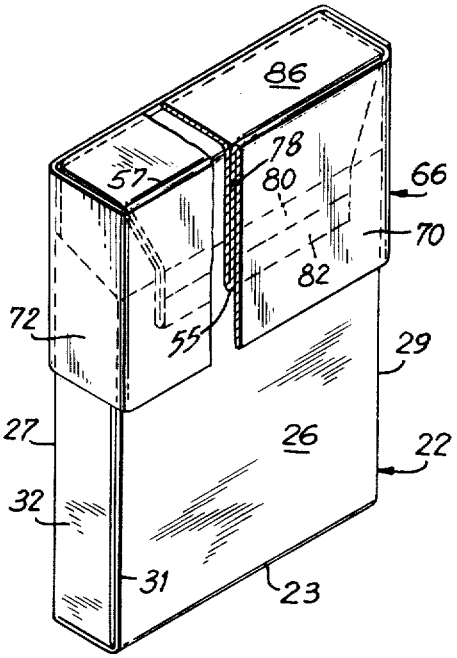
FIG. 5 is a perspective view, from the rear, of the slide receptacle after it has been inserted into and attached to the shell. The slide receptacle is shown in a closed position.
Figure 6:
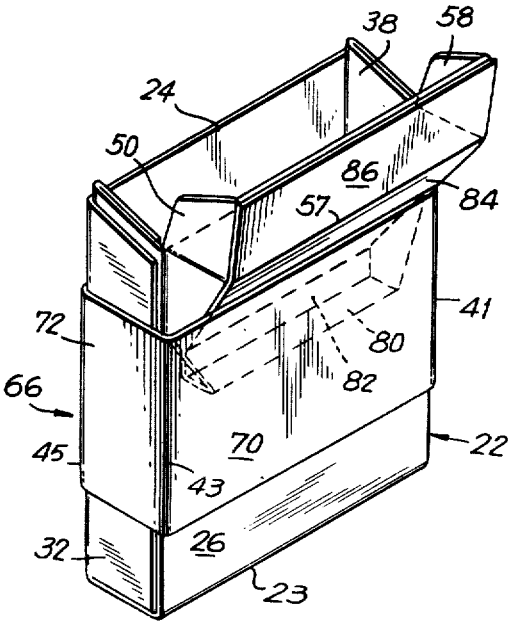
FIG. 6 is a perspective view, from the rear, of the carton of FIG. 5 after it has been opened, to reveal the product contained therein.

As can be seen by an analysis of FIGS. 5 and 6, the initial lowering of the shell 66 results in the folding panels 80 and 82 being lowered in an accordian-like manner so that their inner surfaces, which rested against the inner surface of the [ foldover ] *rear wall* panel [ 78 ] *70* when the carton was closed, become superposed on the [ other ] *outer* surface of the slide receptacle rear wall panel 26. In effect, folding panel 82 experiences rotation, while folding panel 80 undergoes rotation and translation in the space between the shell rear wall panel 70 and the receptacle rear wall panel 26. The initial lowering and accordian action of the shell 66 permits the top of the shell panels 68, 70, 72, 74 and 76 to be lowered below the top of the receptacle front wall panel 24 and to approach the alternate cut and crease line 46. Further lowering of the shell 66 effects a pulling back of receptacle top wall panel 62 and glue panel 64, and the connecting panel 48, thereby opening the contents of the receptacle 22 to a view from above. In effect, the connecting panel 48 is rotated about the alternate cut and crease line 46. The initial lowering of the shell 66 permits a view from the front of the carton only.

It is understood that the foregoing general and detailed descriptions are exemplary of the present invention and are not to be interpreted as restrictive of the scope of the following claims.

What is claimed is:

1. A two-piece, suitably cut and scored paperboard blank capable of being erected into a dispensing carton, comprising a slide receptacle portion and a shell portion, said slide receptacle portion comprising:

a front wall panel;

a pair of opposed side wall panels hingedly connected to the sides of the front wall panel;

a bottom wall panel hingedly connected to the bottom of the front wall panel;

a rear wall panel hingedly connected to the bottom wall panel on the opposite edge from the front wall panel;

a pair of opposed fold-in panels hingedly connected to the sides of the rear wall panel;

a pair of opposed bottom wall glue flaps hingedly connected to the bottom of the fold-in panels;

a rear wall connecting panel depending from the top of the rear wall panel across an alternate cut and crease line;

a pair of opposed fold-in flaps hingedly connected to the sides of the connecting panel; and a top wall panel hingedly connected to the top of the connecting panel; and said shell portion comprising:

a rear wall panel;

a pair of opposed side wall panels hingedly connected to the sides of the rear wall panel;

a front wall panel hingedly connected to one of the side wall panels and extending laterally therefrom;

a side wall panel glue flap hingedly connected to the front wall panel and extending laterally therefrom;

a foldover panel hingedly connected to the top edge of the rear wall panel;

at least one folding panel hingedly connected to and extending from the edge of the foldover panel parallel to rear wall panel top edge;

a hinge *panel* extending longitudinally from and hingedly connected to the adjacent folding panel; and a glue panel extending longitudinally from and hingedly connected to the hinge panel.

2. The blank of claim 1 additionally comprising in the lide receptacle portion a pair of opposed side wall glue laps hingedly connected to the exterior side of each of he fold-in flaps and a pair of opposed side wall glue panels laterally extending from and hingedly connected o each of the side wall fold-in panels.

3. The blank of claim 2 wherein the slide receptacle portion additionally comprises a top wall glue panel ingedly connected longitudinally to the top wall panel.

4. The blank of claim 3 wherein the shell portion omprises two folding panels.

5. The blank of claim 4 wherein the height of the hell side wall panels, shell rear wall panel and shell ront wall panel is about one-half that of the slide reeptacle blank when erected.

6. A carton erected from the blank of claim 1 herein the inner surface of the shell glue panel is dhered to the exposed, outer surface of the slide reeptacle top wall panel.

7. The carton of claim 6 wherein the heights of the olding panels and all other shell panels are such that he rotation and translation of the folding panels are oncealed from view when the carton is either opened r closed.

8. The carton of claim 7 wherein the height of the olding panels is small enough so that the rotation and ranslation of said folding panels caused by the opening nd closing of the carton does not unduly disturb the onfiguration of the erected carton.

9. The carton of claim 8 wherein the height of the hell hinge panel equals the combined heights of the hell foldover panel and the shell folding panels.

*10. A dispensing carton comprising :a slide receptacle aving a body portion with an open end and a cover ortion hingedly connected to said body portion for pivtal movement between a closed position covering said pen end and an open position displaced therefrom; and shell having a slide portion and actuating means joined thereto, said slide portion being slidably mounted on said body portion of said receptacle for sliding movement toward and away from said open end, and said actuating means including a first panel portion hingedly connected to said cover portion at a location spaced from the hinge connection of said body and cover portions, a second panel portion hingedly connected to said slide portion, and a folding panel portion hingedly connected along opposite margins between said first and second panel portion, all of said hinge connections being substantially parallel to one another, and said actuating means extending between said receptacle and said slide portion with said first and second panels thereof extending away from said open end from their hinge connections with said cover portion and slide portion, respectively.*

*11. The carton of claim 10 wherein said folding panel portion consists of at least two panels hingedly connected to one another, the hinge connection therebetween being substantially parallel to the other hinge connections of said carton.*

*12. The carton of claim 10 wherein the length of said first panel portion is substantially equal to the combined lengths of said second panel portion and said folding panel portion, wherein said cover portion and body portion have rear walls lying in a common plane, and wherein said hinge connections of said first and second panel portions to said cover portion and said slide portion are adjacent the outer margins of, respectively, said cover portion rear wall and said slide portion, so that said slide portion is at least in part disposed over said cover portion in said closed position, and is displaced therefrom by sliding of said slide portion away from said open end.*

*13. The carton of claim 10 wherein said receptacle is of generally rectangular cross section, and wherein said slide portion comprises a band extending in close conformity thereabout.*

* * * * *